United States Patent
Griesemer et al.

(10) Patent No.: US 6,522,094 B1
(45) Date of Patent: Feb. 18, 2003

(54) MOTOR OVERLOAD COIL CONTROL AND METHOD OF CALCULATING OPERATING TEMPERATURE

(75) Inventors: Patrick J. Griesemer, Franklin, WI (US); Christopher J. Wieloch, Brookfield, WI (US); Kurt von Eckroth, Oconomowoc, WI (US)

(73) Assignee: Eaton Corporation, Cleveland, OH (US)

( * ) Notice: Subject to any disclaimer, the term of this patent is extended or adjusted under 35 U.S.C. 154(b) by 53 days.

(21) Appl. No.: 09/718,015

(22) Filed: Nov. 21, 2000

Related U.S. Application Data

(62) Division of application No. 09/267,980, filed on Mar. 12, 1999, now Pat. No. 6,208,100.

(51) Int. Cl.[7] .................................. H02P 7/30
(52) U.S. Cl. .................. 318/430; 318/471; 318/434; 388/907.5
(58) Field of Search .................. 318/430, 431, 318/434, 471, 474; 388/903, 907.5, 934

(56) References Cited

U.S. PATENT DOCUMENTS

| | | | |
|---|---|---|---|
| 3,604,982 A | * | 9/1971 | McDonald |
| 3,868,554 A | * | 2/1975 | Konrad .................. 318/434 |
| 4,220,900 A | * | 9/1980 | Mintz .................. 318/266 |
| 4,394,607 A | * | 7/1983 | Lemirande .................. 318/453 |
| 4,514,665 A | * | 4/1985 | Melocik et al. .............. 318/139 |
| 4,626,753 A | * | 12/1986 | Letterman .................. 318/471 |
| 6,283,631 B1 | * | 9/2001 | Gousset et al. .............. 374/152 |

* cited by examiner

Primary Examiner—Bentsu Ro
(74) Attorney, Agent, or Firm—Timothy J. Ziolkowski

(57) ABSTRACT

A motor overload coil control is disclosed for use in a motor starter/relay contactor. The control includes an 8-bit, 8-pin microcontroller that together with an I/O reduction circuit, is capable of functioning 13 I/O's with only 5 I/O pins on the microcontroller. Three remote signals are prioritized and reduced on one input line to the microcontroller. The control includes three-phase current measurement from three Hall effect current sensors positioned one on each leg. The system includes current integration to provide a single current input to the microcontroller. A full load amperage (FLA) adjustment allows use on a wide range of motors. The microcontroller uses the FLA adjustment and the current signal to find an appropriate $I^2t$ value for real-time monitoring of the operating temperature of the motor. A status indicator is provided having an LED output to show the status of the system and indicate the motor temperature, when appropriate. After the coil is initially pulled in, the microcontroller generates a PWM signal to keep the appropriate coil pulled in with reduced power. The system includes an internal 24VDC sensor to ensure proper DC voltage level, and to adjust the PWM for variances in voltage levels. Pushbutton test and reset switches are provided, as well as a solid state remote reset.

23 Claims, 11 Drawing Sheets

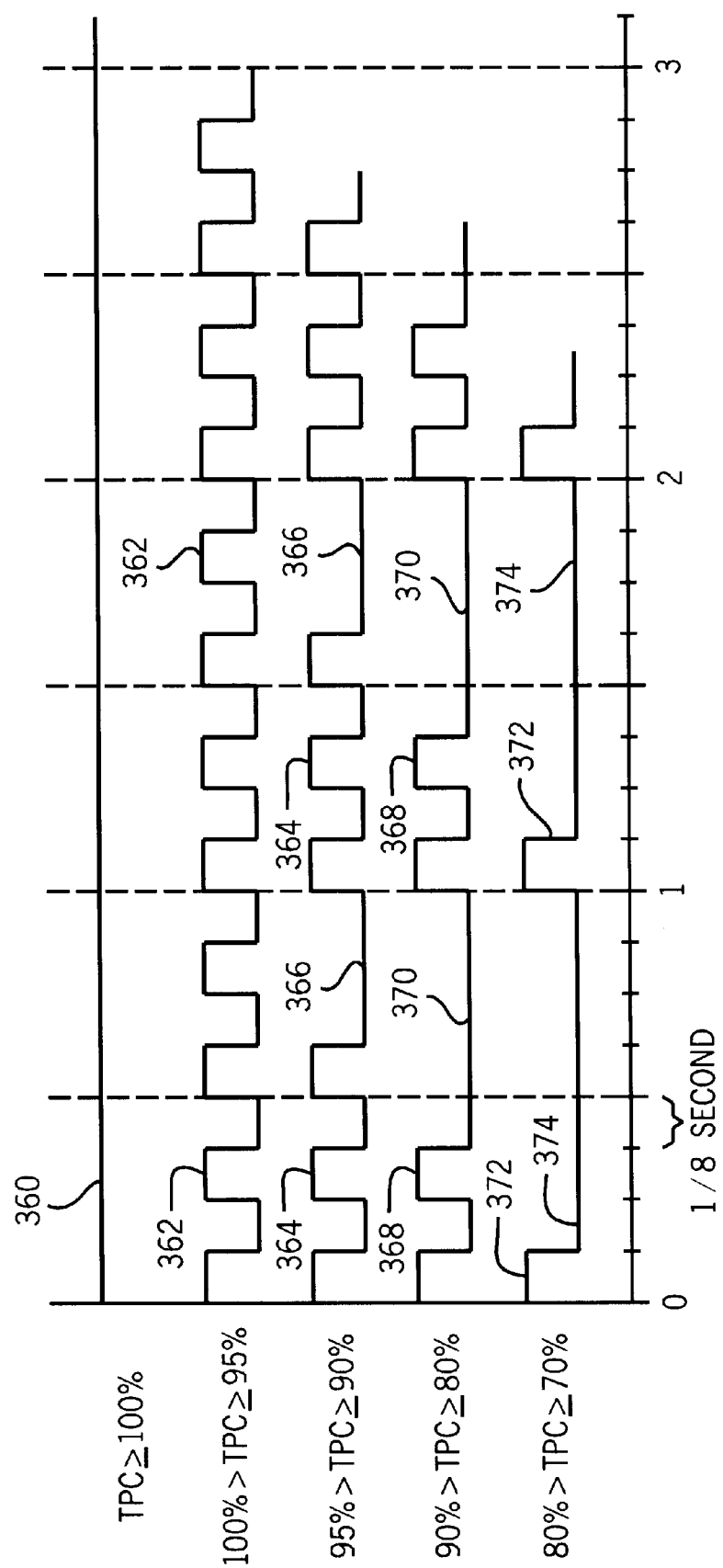

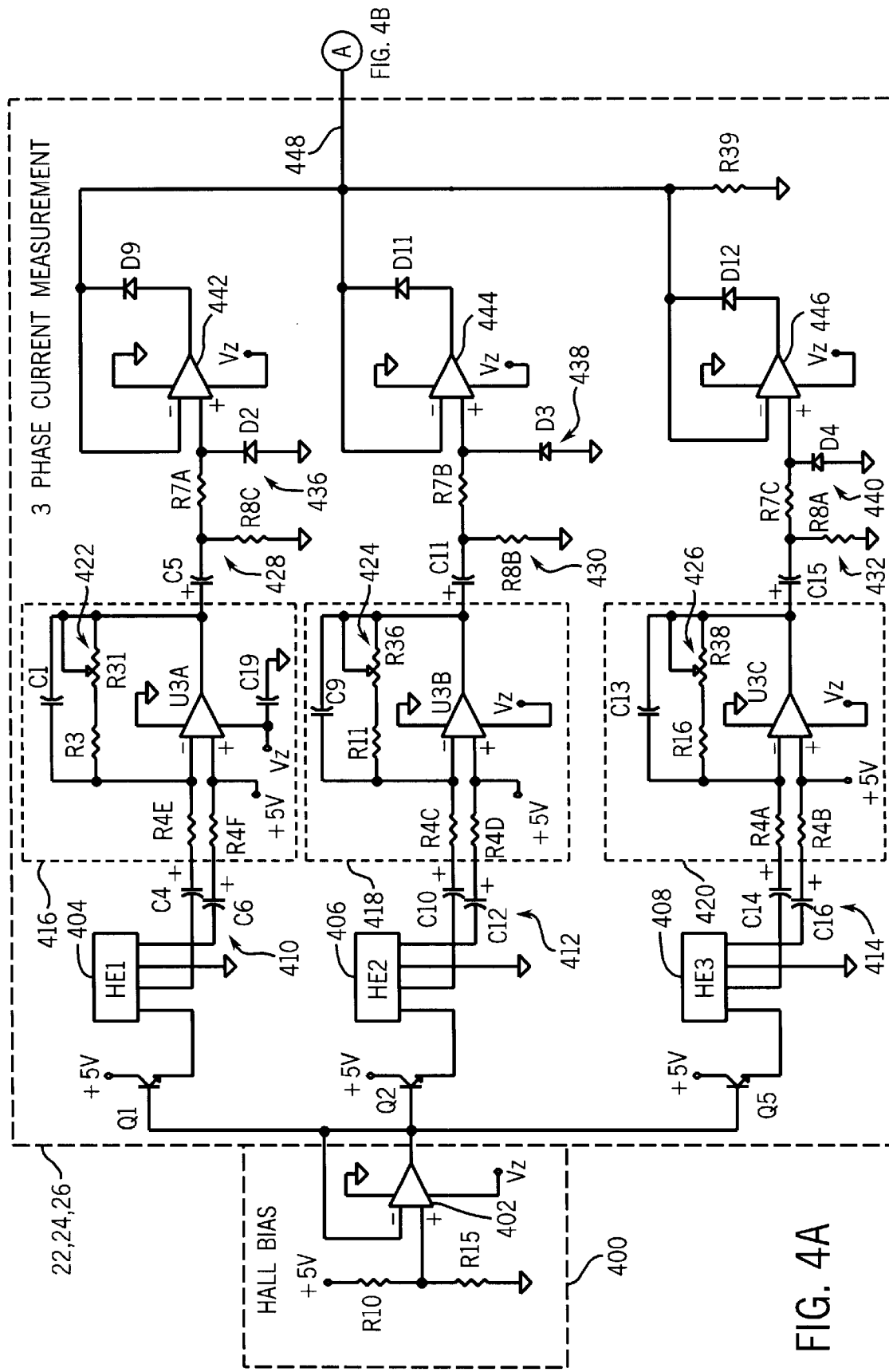

MOTOR OVERLOAD COIL CONTROL AND METHOD OF CALCULATING OPERATING TEMPERATURE

CROSS-REFERENCE TO RELATED APPLICATION

This application is a divisional of allowed U.S. application Ser. No. 09/267,980, filed Mar. 12, 1999, entitled MOTOR OVERLOAD COIL CONTROL, now U.S. Pat. No. 6,208,100B1.

BACKGROUND OF THE INVENTION

The present invention relates generally to overload relays for electromagnetic contactors, and more particularly to a control system for controlling the coil in an electromagnetic motor starter that uses an 8-pin, 8-bit microcontroller and I/O reduction circuitry to process at least 13 I/O's and calculate the operating temperature of a motor on a real-time basis.

In typical electromagnetic contactors, an overload relay is used to protect a particular load, such as a motor, from excess current and heat. Known overload relays incorporate bi-metal switches which require hand bending and tweaking to calibrate for a particular device. Needless to say, accuracy is suspect after field adjustments are made, such as once the full load amperage (FLA) adjustment is made. Further, such bi-metal switches and heaters used in existing overload relays, are typically connected in series with the contacts of a contactor. These bi-metal devices therefore require separate invasive connections between the contactor and overload relay, and not only increase the cost and size of the starter, but also the manufacturability of the device.

Another problem with such known electromagnetic overload relays is the use of current measurement devices such as current transformers and torroids. Current transformers are large and bulky, thereby adding to the overall size and cost of the device. Torroids are not as large, but still add to the size and expense of the package, and offer limited accuracy and range.

Therefore, it would be desirable to have a motor overload coil control capable of using the relatively tiny Hall effect sensors which have a much wider dynamic range for sensing current. Further, it would be desirable to have such a device that eliminates the need for the mechanical bi-metal switches.

SUMMARY OF THE INVENTION

The present invention provides a motor overload coil control that solves the aforementioned problems, while maintaining a relatively low cost control.

In accordance with one aspect of the invention, a motor overload coil control includes a number of inputs and outputs (I/O's) to and from the motor overload coil control having j inputs and k outputs. The I/O's include at least one reset input, a current sense input, a full load amp (FLA) input, a coil control input, a coil control output, and a status output. The control includes a microprocessor having n input lines, where n is less than j+k. A motor overload reduction circuit is provided for connecting the j inputs and the k outputs to the microcontroller in a manner to prioritize and consolidate X I/O's such that the number of I/O's is reduced, but still exceeds the number of I/O lines of the microcontroller. The microcontroller is programmed to use a number of its I/O pins to function as both an input and an output.

In accordance with another aspect of the invention, the microcontroller is programmed to calculate a first order differential equation to keep real-time track of the motor's temperature and provide a status indication of that temperature when it exceeds a pre-determined range. The system can be set to activate an alarm and disable the motor at the expense of the process, or activate an alarm and a visual status indication, and maintain motor operation in critical processes.

The control includes an 8-bit, 8-pin microcontroller that together with an I/O reduction circuit, is capable of functioning 13 I/O's with only 5 I/O pins on the microcontroller. Three remote inputs are received into the reduction circuit from a remote source. The remote signals are prioritized and reduced on one input line to the microcontroller. The control includes three-phase current measurement from three Hall effect current sensors, each positioned on a bus bar for each phase. The system includes amplification, half-wave rectification, and integration of the current signals to sum the current signals and provide a single input to the microcontroller. The system includes a full load amperage (FLA) adjustment to allow use on a wide range of motors. A status indicator is provided having an LED output for showing the status of the system and indicating the temperature of the motor, when appropriate. The system uses 24 VDC coils, and after the coils are initially pulled in, the microcontroller generates a PWM signal to keep the appropriate coil pulled in at reduced power levels. An internal 24 VDC sensor is used to ensure the proper level of DC voltage and to adjust the PWM for variances in the DC voltage level. A pushbutton test switch is provided, as well as a pushbutton local reset and a solid state remote reset. The use of an 8-bit, 8-pin microcontroller in such a motor overload coil control, allows the system to solve a first-order differential equation to keep real-time track of the operating temperature of the motor, while at the same time keeping the overall cost of the control relatively low. The microcontroller has a look-up table for finding an appropriate $I^2t$ value based on the FLA adjustment and the value of the sensed current. The $I^2t$ value is used in realtime monitoring of the operating temperature of the motor.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings:

FIG. 3 is a timing diagram of the flow chart of FIG. 2E.

FIGS. 4A–4D is a circuit schematic for implementation of the control of FIG. 1.

DETAILED DESCRIPTION OF THE PREFERRED EMBODIMENT

Figure 1:
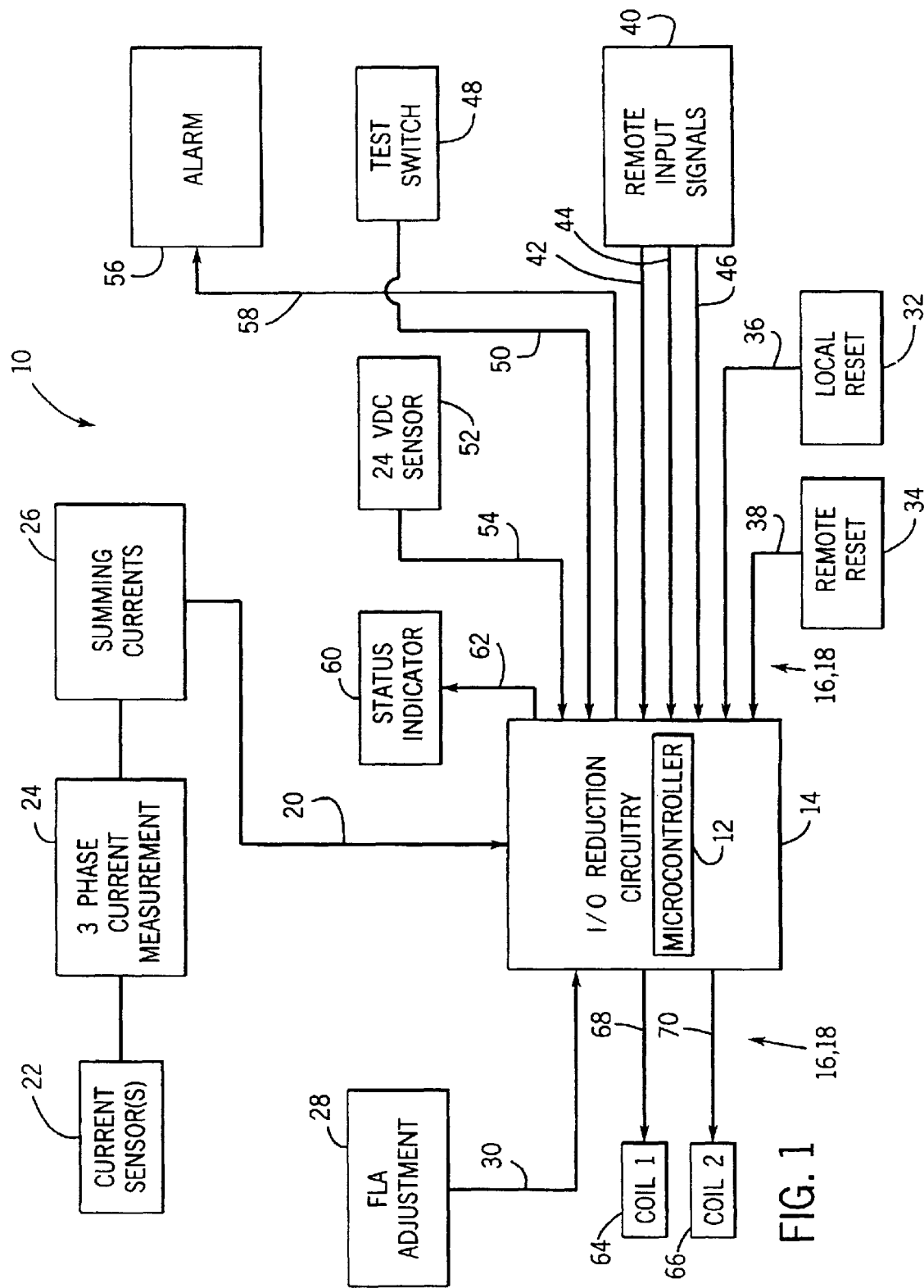
FIG. 1 is a block diagram of a control according to the present invention.

Referring to FIG. 1, a block diagram of a motor overload coil control 10 is shown according to the present invention. In a preferred embodiment the motor overload coil control 10 includes an 8-bit, 8-pin microcontroller 12 as a component of a motor overload I/O reduction circuit 14. It is understood that the microcontroller may equivalently be a microprocessor, a PLC, or other equivalent device, whether programmable with software or discrete logic. In general terms, I/O reduction circuit 14 has a plurality of inputs 16 and outputs 18 (I/O's). The microcontroller 12 has n input/output (I/O) lines and the motor overload circuit 14 is connected to j inputs and k outputs.

The motor overload coil control 10 includes a current sense input 20 from a current sensor 22. In a preferred embodiment, current sensor 22 includes three Hall effect current sensors to sense the current on each phase of a three-phase system. A three-phase current measurement circuit 24 is connected to the current sensor(s) 22 through an appropriate biasing circuit, as will be described with reference to FIG. 4A. A current summing and integration circuit 26 receives the three-phase current measurements and supplys a current sense signal on the current sense input 20 to the I/O reduction circuit 14 and microcontroller 12.

Other inputs include a full load amp (FLA) adjustment device 28 is provided to calibrate the motor overload coil control 10 for use with motors of various size. The FLA adjustment 28 is connected to the I/O reduction circuit 14 through an FLA input 30. Two other inputs include a local reset 32 and a remote reset 34, each connected to the I/O reduction circuit 14 and the microcontroller 12 via a local reset input 36 and a remote reset input 38, respectively. A set of remote control inputs 40, which can include an enable input 42, a forward input 44 and a reverse input 46, are connected to the I/O reduction circuit 14 and the microcontroller 12.

A test switch 48 is provided to test the motor overload coil control and is connected to the I/O reduction circuit 14 via a test switch input 50. A circuit voltage sensor 52 is provided to monitor internal circuit voltage, which in the preferred embodiment is 24 VDC, and is connected to the I/O reduction circuit 14 via a 24 VDC sensor input 54.

The outputs include an alarm 56 connected to an alarm output 58 from the I/O reduction circuit 14, and a status indicator 60 connected to receive signals via a status indicator output 62 from the microcontroller 12 of I/O reduction circuit 14. A pair of coils 64, 66 are connected to outputs 68, 70 of the I/O reduction circuit 14 to individually control each coil. Although the motor overload coil control 10 is capable of controlling two coils 64 and 66, the motor overload coil control of the present invention is designed to work equivalently for one-coil applications as well. In such one-coil applications, the reverse input 46 would not receive input signals. In a two-coil application, one coil would function as a forward coil to control forward motion of a motor (not shown), and the other coil would function as a reverse coil to control reverse motion of the motor.

The I/O reduction circuit 14, in conjunction with the microcontroller 12, connects at least 13 I/O's 16, 18 to the microcontroller 12 in such a manner to allow the use of a 8-pin microcontroller, in which only five pins are available for I/O's, as will be further described with reference to FIG. 4.

The motor overload coil control 10 operates on 24 VDC and utilizes coils 64 and 66. The microcontroller is programmed to create a PWM signal from a D.C. source to reduce the holding voltage after the coils are pulled in. Since coil control of a motor is considered a critical function, one pin of the microcontroller 12 is dedicated for coil control output, which thereby leaves only four pins available for multiple I/O function. The 8-pin, 8-bit microcontroller sequences analog signal sampling and energizes and de-energizes outputs in a manner to maximize the number of functions controllable to minimize the peripheral hardware.

Figure 2A:
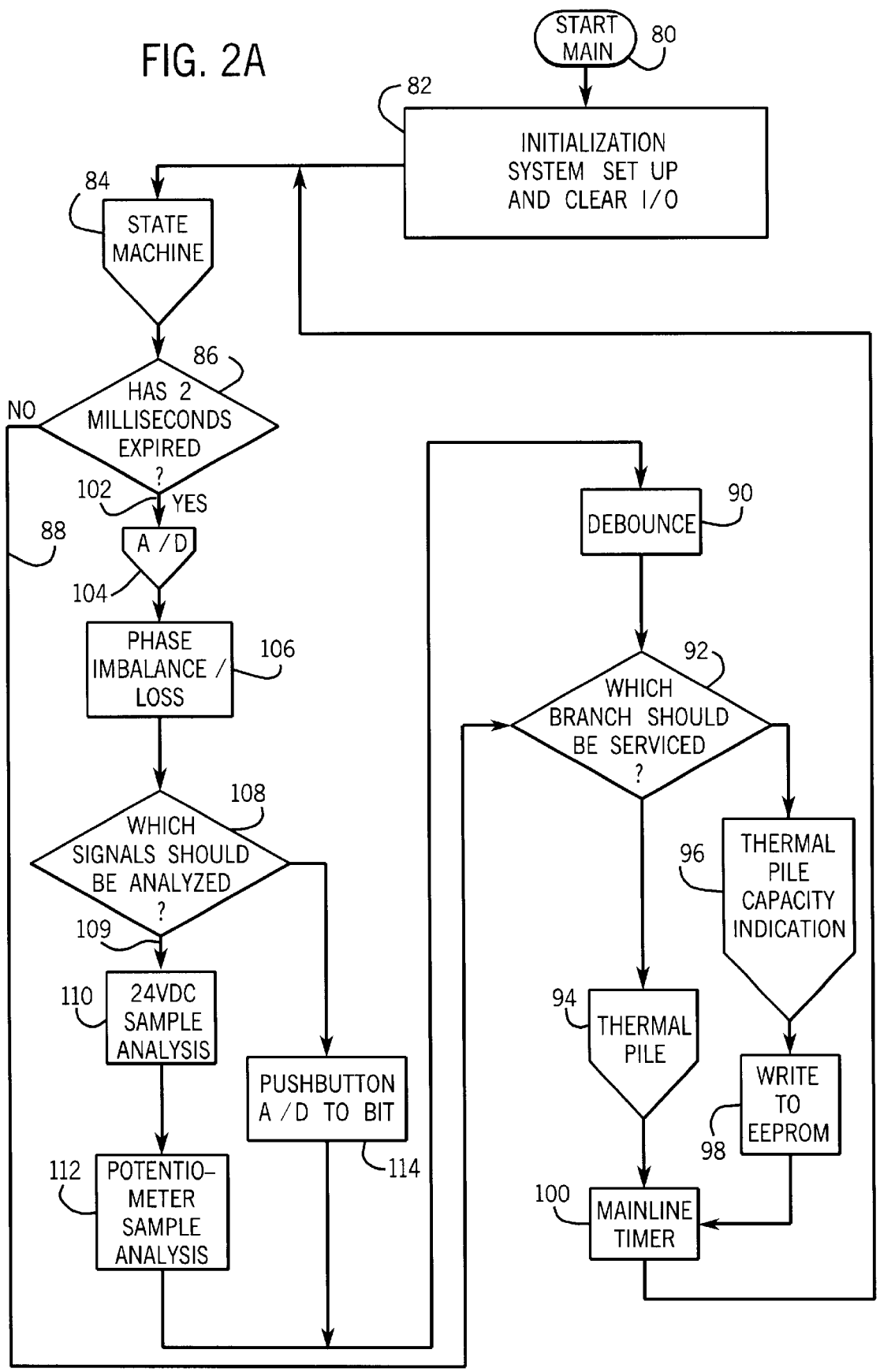
FIG. 2A is a flowchart for the main line algorithm programmed into the control of FIG. 1.

FIG. 2A shows the main loop 80 for the software as programmed in the microcontroller 12 of FIG. 1. The initialization process 82 includes clearing all outputs or initializing the outputs as required, clearing the RAM, retrieving the last thermal pile calculation from EEPROM, load an interrupt timer, and initialize a one-second power-up delay. A 2 ms. timer is also initiated. Once initialized, the system state machine 84 subroutine is called. The state machine 84, as will be further described with reference to FIG. 2C–D, is a method of tracking and limiting overload functionality based on the previous state of the system and the current state. The 2 ms. timer is then monitored 86 to see if it has expired, and if not 88, a decision is made as to which branch to service next 92, the thermal pile calculation 94 or the thermal pile capacity indication output 96. The thermal pile calculation 94 will be described hereinafter in detail with reference to FIG. 2B. The thermal pile capacity indication output 96 will be described hereinafter in detail with reference to FIG. 2E.

Periodically, the thermal pile data is written to EEPROM at 98, after which the main line timer 100 is executed based on a flag set in an interrupt every 2 ms. During the timing routine, a status indicator flag is set to indicate status indicator servicing and generates a sequencer in the thermal pile subroutine 94. In a preferred embodiment, the main line timer is 2 ms.

The decision as to which branch should be serviced 92, is made based on the value of a sequencer as determined in the thermal pile subroutine 94. If the sequencer has a value of zero, the last thermal pile calculation has been completed, and the thermal pile capacity indication 96 can be called. On the other hand, if the sequencer has a non-zero value, the thermal pile subroutine 94 is called.

After the main line timer has executed 100, the main algorithm returns to the state machine subroutine 84. After which, if the 2 ms. period timer has expired 102, an analog to digital (A/D) conversion routine 104 is called. The A/D conversion module 104 is therefore sequenced every 2 ms. The microcontroller I/O hardware is modified, as will be described with reference to FIG. 4, to properly measure the analog signals while not generating false output data. The current is monitored every sequence 106 and phase imbalance and phase loss is executed for every current sample taken. As will be evident from FIG. 4, the current sample is filtered using a first-order digital filter to reject noise and signal excursions. In a balanced three-phase system, the output will yield, approximately, a constant DC value. This filtered current provides a base line value to compare phase anomalies that may occur. If a series of samples over a given time deviates from the base line by more than 50%, for example, the motor overload coil control will enter a tripped state, as will be described with reference to FIG. 2C–D, and cause the control to trip. Either a phase loss or a phase imbalance will cause such a trip.

The next step in the main algorithm of FIG. 2A is to decide which analog signals should be analyzed at 108. Although the current is monitored at 106 every sequence, the remaining four analog signals are cycled in pairs to maximize the main algorithm execution and allow the highest sampling rate for current measurement, since current measurement is considered the most important function. The alternating pairs include the 24 VDC sense 110 and the FLA adjustment 112 during one iteration, and during a next iteration, the resets and remote inputs 114 are sensed and A/D converted. Therefore, the paired analog signals 110, 112, and 114 are read every 4 ms. The pushbutton inputs 114 not only include the remote inputs, such as enable, forward, and reverse, but also the resets, including the remote reset and the local reset.

The enable, forward, and reverse voltages are read and converted to a flag, which is debounced in the debounce routine 90. As will be described further with reference to FIG. 4, the two reset inputs, the local reset and the remote reset, can be detected singly, separately from detecting both resets being activated at the same time. The local reset pushbutton can be mechanically locked to yield an automatic reset mode. However, if the local reset pushbutton is not locked, the motor overload coil control is in a manual reset mode. The same can be done with the remote reset if the remote reset pushbutton is depressed. That is, as will be evident from the description with reference to FIG. 4, if the remote reset is energized with 24 VDC, the control can operate in an automatic reset mode, and if the remote reset pushbutton is not energized, then the control is in the manual reset mode. Therefore, the local reset and the remote reset can be assumed to be mutually exclusive. However, when both reset buttons are energized or active, the control enters an alarm only mode. For critical operations where continued operation of the process is more important than the life of the motor, the system will not interrupt motor operation if the temperature of the motor (i.e., thermal pile) exceeds a maximum threshold. In the alarm only mode, the control only energizes an alarm output and a visual output when, the trip threshold is exceeded, and keeps the motor running. Referring back to FIG. 2A, the reset data is debounced at 90 prior to a change in state in the state machine 84.

Each time the 24 VDC analog signal is measured, a 24 VDC sample is analyzed at 110 and activation of the test switch is checked. The 24 VDC sample analysis is done in order to set the PWM rate based on the current input voltage to the control circuit. Prior to making any change to the PWM rate, the 24 VDC sample signal is averaged for approximately ¼ sec. If the test switch 48, FIG. 1, is detected, during the 24 VDC sample analysis 110, FIG. 2A, the signal is debounced 90 and analyzed in the state machine subroutine 84. The other analog signals analyzed in branch 109 are the potentiometer sample analysis 112 which is an input from the FLA adjustment 28, FIG. 1. The potentiometer sample analysis 112, FIG. 2A, is executed each time the FLA potentiometer analog signal is measured and averages ¼ sec. of samples. The averaged sample is used to find an appropriate value in a look-up table, the result of which is scaled based on the resolution of the stored value. The resulting FLA multiplier is then used to calculate the thermal pile in 94. As previously mentioned, all A/D converted inputs are debounced at 90 to eliminate noise and make certain that the signal being analyzed is valid.

Figure 2B:
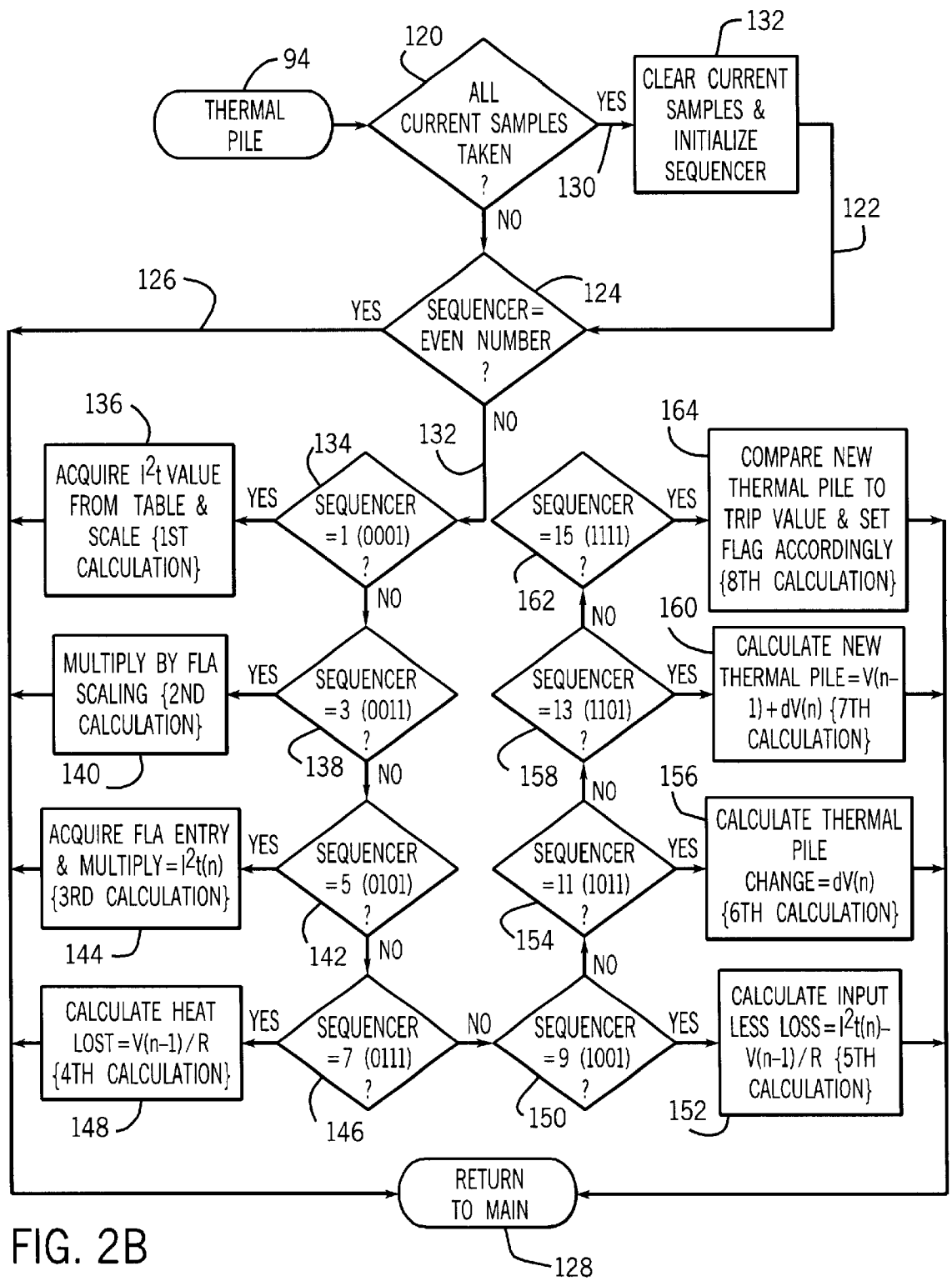
FIGS. 2B–2E are flowcharts of subroutines called in the main line algorithm of FIG. 2A.
Figure 2C:
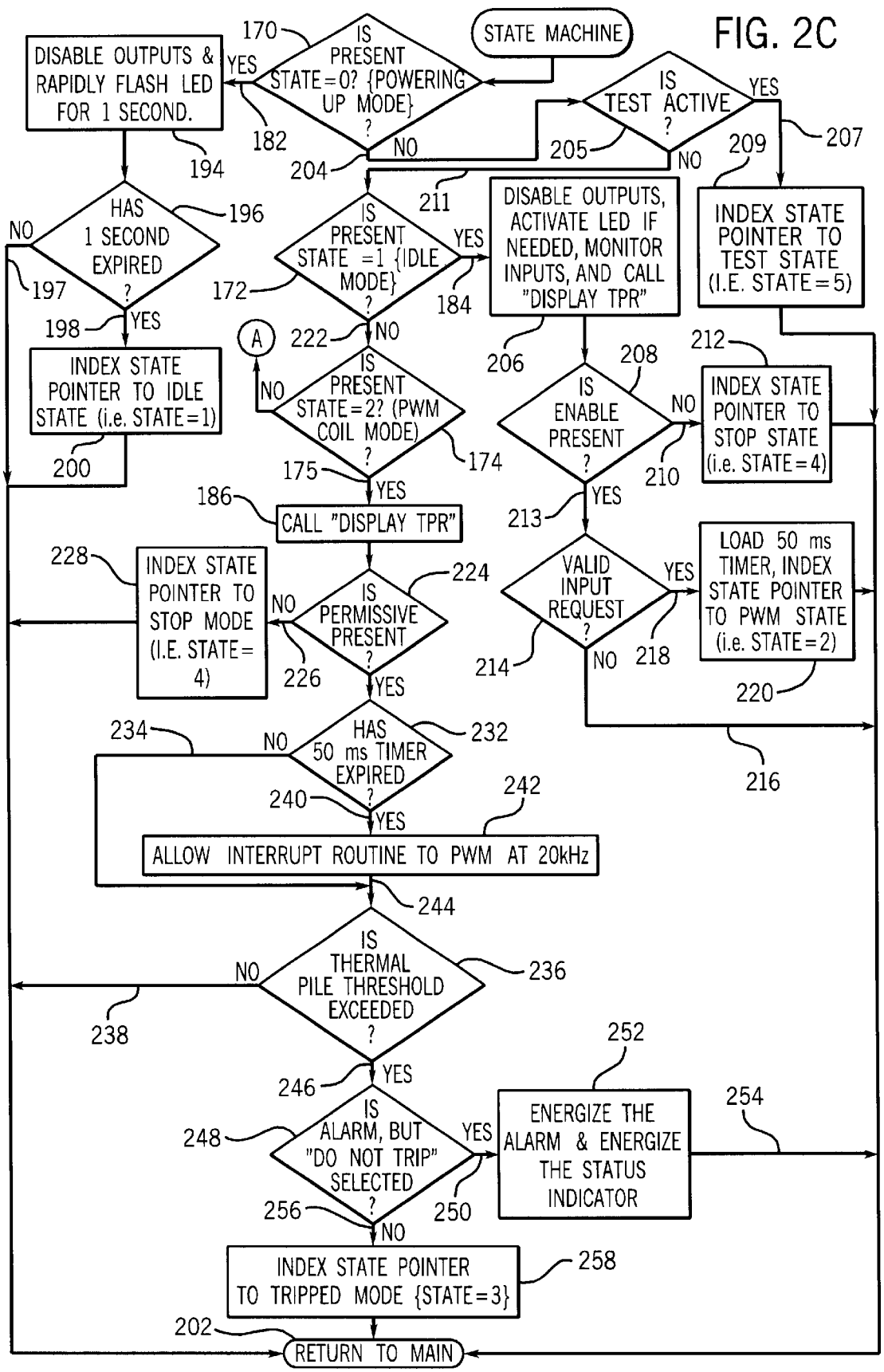
Figure 2D:
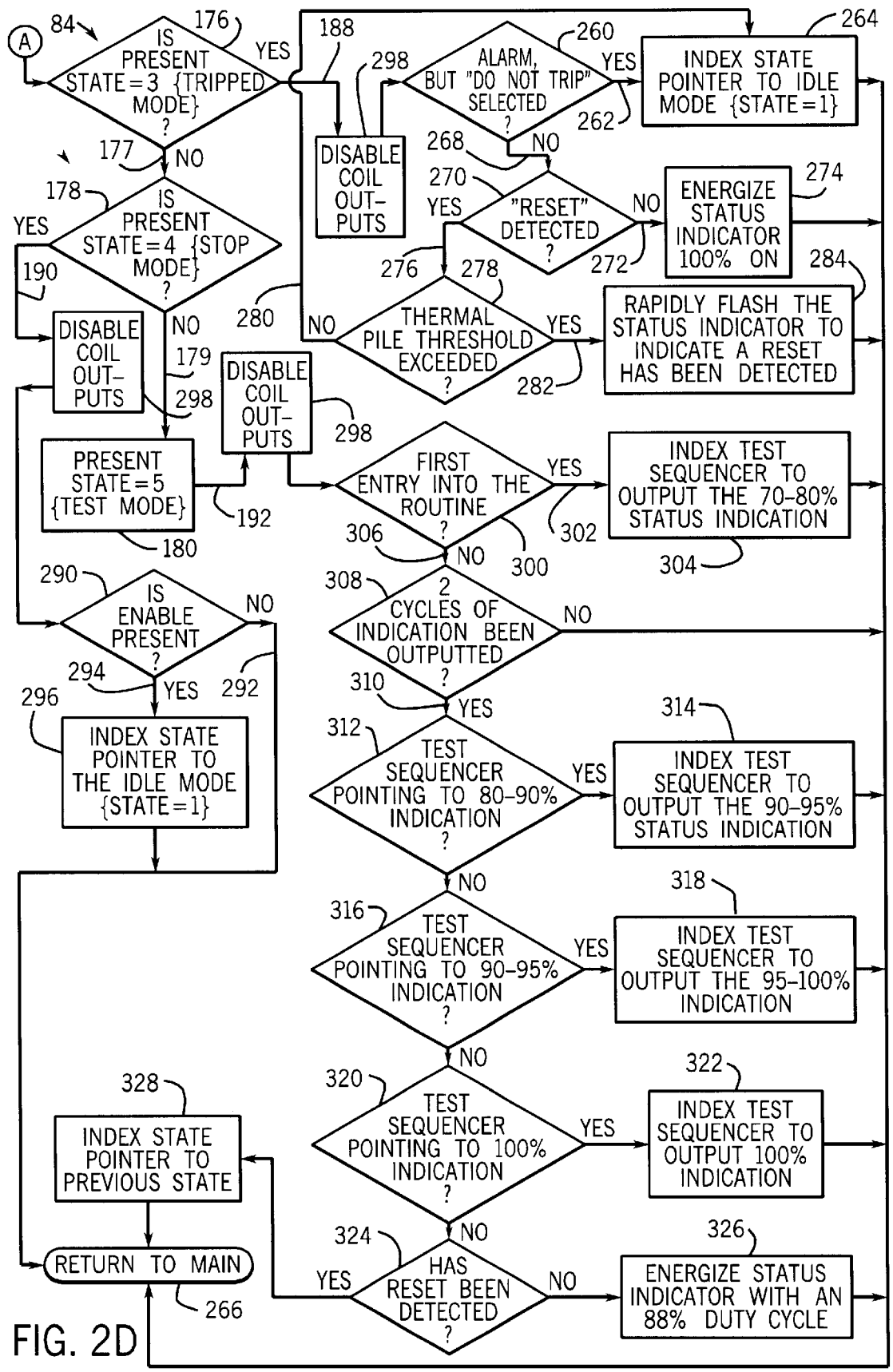

Referring to now to FIG. 2B, the thermal pile subroutine 94 will be described. Initially, a check is made to see whether sufficient current samples have been taken 120 and if not 122, and if the sequencer 124 is either zero or an even number 126, then the system exits the thermal pile subroutine 128. However, if sufficient current samples have been taken 120, 130, then the current sample register is cleared and the sequencer is initialized at 132. Again, if the sequencer is not an odd number 124, 126, the thermal pile subroutine 94 exits at 128 and returns to the main algorithm of FIG. 2A. If, on the other hand, the sequencer is an odd number 132, whether or not the full current samples have been read at 120, then one step in the math calculation in determining the thermal pile analysis is calculated. Before explaining each of the remaining iterations in the thermal pile subroutine 94, the following describes the thermal pile analysis.

The thermal pile analysis is based on an electrical equivalent model of the heating of an electrical motor. The differential equation to be solved is given by:

$$dV(n) = (I^2 t - V/R(n-1)) 1/C \cdot dt,$$

where $I^2 t$ is preferably first multiplied by the square of the FLA. The $I^2 t$ value is the RMS current squared, multiplied by the model analysis interval, which in this case is 64 ms. The $I^2 t$ value is selected from a look up table using the current sense signal as found in the main algorithm of FIG. 2A. C is a motor model capacitance, and R is a motor model thermal resistance representing heat transport away from the motor, and V is the thermal pile, or calculated temperature of the motor. Although it is understood that the thermal pile calculation can be accomplished in less time, the model mathematics is sequenced to maximize execution times.

To find $I^2 t$, the aforementioned filtered current is used as a pointer to select an appropriate value from the look up table, and that value is scaled based on the number of bits required to represent that value in the stored location to acquire the correct resolution. In order to maximize the main line execution of the control, one math step is executed with each iteration of the main line, as shown in FIG. 2B. As described, while the sequencer is a non-zero odd number 124, 132, the various math steps are done on a one-per-iteration basis in the thermal pile subroutine 94. For example, when the sequencer is equal to one at 134, the $I^2 t$ value is acquired from the look up table and scaled at 136, after which, the system returns to the main line 128. When the sequencer is equal to three at 138, the value found from the first equation 136, is then multiplied by the FLA scaling factor in 140, and then the thermal pile subroutine 94 returns to the main line 128. When the sequencer is equal to five at 142, the FLA value is acquired from the look up table and multiplied by the value found in the second calculation 140. When the sequencer reaches seven at 146, the heat lost is calculated at 148, and when the sequencer reached nine at 150, the heat input less the heat loss is calculated at 152. After the sequencer reaches eleven at 154, the change in the thermal pile is calculated at 156, and as in each of the other calculations, returns to the main line 128. When the sequencer reaches thirteen at 158, the latest thermal pile is calculated at 160, and when the sequencer reaches fifteen at 162, the new thermal pile is compared to the predetermined trip value, and if it equals or exceeds the predetermined trip value, the trip flag is set at 164 and the thermal pile subroutine returns to the main line 128.

Referring now to FIG. 2C-D, the state machine subroutine 84 will now be described. The state machine determines which state the system should be in and what actions to take while in that state.

FIG. 2C is a flow chart of the state machine subroutine 84 of FIG. 2A. Upon entering the state machine subroutine 84, the subroutine first determines which state the system is presently in, by checking a number of decision blocks 170–180. That is, if the present state is in the Power-up mode, path 182 is executed. If the present state is in the Idle mode, path 184 is executed. If the present state is in the PWM Coil mode 174, path 175 is executed. If the present state is in the Trip mode, FIG. 2D, path 188 is executed. If the present state is in the Stop mode, path 190 is executed, and if the present state is in the Test mode, path 192 is executed.

Referring back to FIG. 2C, upon initialization and power-up, the present state is set to zero, the Power-up mode, and path 182 is followed, which first ensures that the coil(s) and alarm are disabled and rapidly flashes the status indicator 194 to indicate the power-up mode. The status indicator continues to flash rapidly until 1 second has expired 196, and when it has 198, the state is incremented to state 1 at 200, at which time the state machine is returned to the main algorithm at 202. Until the one second timer has expired 196, 197, the subroutine returns to execute the main algorithm 202.

After executing the main line algorithm of FIG. 2A, and the system re-enters the state machine subroutine 84, the present state is no longer in the Power-up mode 170, 204, the Test pushbutton is monitored at 205, and if it is active 207, then the state is changed to the Test state 209 and the subroutine is returned to the main algorithm 202. If, on the other hand, the Test pushbutton is not depressed, 205, 211, the system checks to see if the present state is in the Idle mode 172, and if it is 184, the outputs to the coils are disabled 206, and the status indicator is activated if required to display the thermal pile output according to FIG. 2E. The inputs are also monitored and debounced at 206, as well as calling the display TPR subroutine 96 of FIG. 2E. The remote enable input signal is then monitored 208, and if the system is not enabled 210, the state is changed to the Stop mode (state 4) at 212 and the state machine subroutine 84 returns to the main algorithm at 202. However, if the enable is present 208, 213, a check is made to see whether or not a forward or reverse remote signal has been received at 214. If it has not 216, the system is returned to the main algorithm 202. If a valid forward or reverse input signal has been received 214, 218, the 50 ms. timer is initiated and the state is changed to the PWM state (state 2) at 220. The forward/reverse information is saved, or latched, and the interrupt energizes the coil at 100% duty cycle, then thereafter reduces the duty cycle to 20%. The state machine subroutine is returned to the main algorithm 202.

Figure 2E:
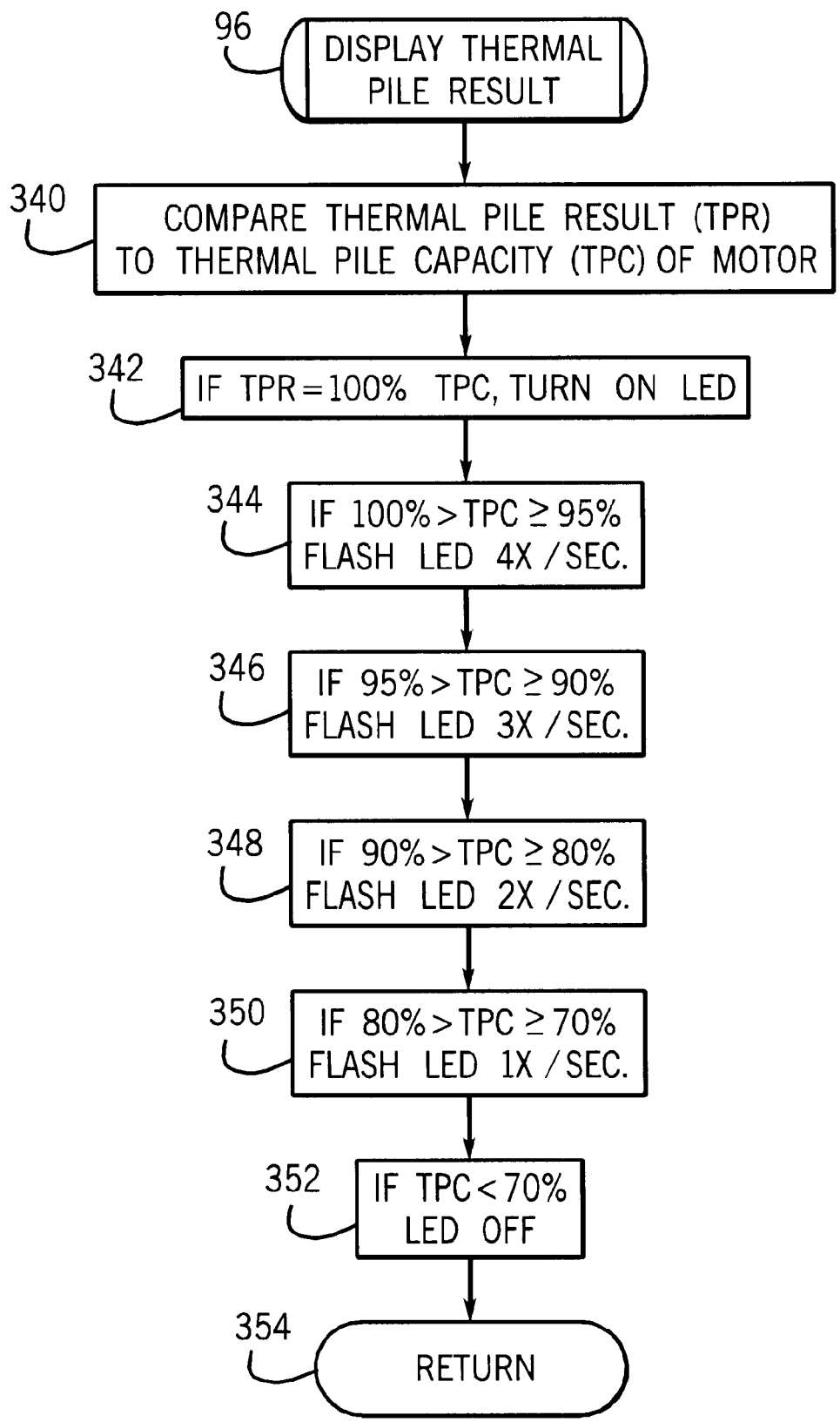

After the next iteration of the main loop of FIG. 2A, and the present state is state 2, or the PWM Coil mode of operation, the state machine 84 proceeds past the Power-up mode state check-points 170, 204, and past the Idle mode state check-points 172, 222, and into the PWM Coil mode 174, 175. First, the display TPR subroutine 186, 96 of FIG. 2E, is called and when complete, it returns operation to check if there is not an enable (permissive) signal present 224, 226 of FIG. 2C, and then the index state pointer is set to the 4th state, or the Stop mode in 228 and the state machine algorithm exists at 202 to return to the main algorithm of FIG. 2A. However, if an enable signal is present at 224, FIG. 2C, the PWM coil mode proceeds to check whether the 50 ms. timer that was loaded in state 1 has expired at 232, and if it has not 234, the thermal pile is checked to see if it has exceeded a predetermined maximum 236. If the thermal pile has not equaled or exceeded the maximum 238, the state machine returns to the main algorithm to allow the 50 ms. timer 232 to expire, or some other intervening event. The 50 ms. timer allows at least a full 50 ms. of full power to be applied to the coil before beginning to modulate power-down. When the 50 ms. timer expires 232, 240, the interrupt routine is allowed to PWM the coil at the preferred 20 kHz at 242. When the interrupt relinquishes control 244, the thermal pile is checked to see if it has exceeded the predetermined maximum 236, and if it has 246, either after the interrupt relinquishes control 244 or if the 50 ms. timer has not expired 232, 234, then a user-defined alarm, but Do-not-trip mode is checked to see if it has been selected by the user at 248. This mode is selected only when the system or process that the motor is running in, is more critical than the motor and must be kept running at the expense of the motor. In such a case 250, the alarm and the status indicator are energized at 252, but the system stays in the PWM coil mode 254 maintaining the motor in its present state. If the Do-not-trip is not selected 256 and the thermal pile has been exceeded 246, the state pointer is incremented to the Tripped mode 258 and the system is returned to the main algorithm 202.

The state machine is continued in FIG. 2D in that if the present state is in the Trip mode 176, 188, the coil outputs are disabled 298 and then the alarm but Do-not-trip is checked at 260, and if it has been set 262, then the state pointer is indexed to the Idle mode 264 and returned to the main algorithm 266 to allow the coil and the motor to be activated. If the alarm but Do-not-trip has not been selected 260, 268 and there has not been a reset 270, 272, then the status indicator is turned ON 274, the state machine stays in the trip mode and returns 266 to the main algorithm. If a reset had been detected 270, 276, then the thermal pile is again checked to see if it has exceeded the threshold 278, and if it has not 280, then the state pointer is indexed to the Idle mode 264 and the state machine is returned to the main algorithm at 266. However, if the thermal pile threshold has exceeded the predetermined maximum 278, 282, then the status indicator is flashed rapidly to indicate that the reset has been detected 284 and the system returns to the main algorithm at 266.

When the state of the state machine is set to 4, the Stop mode, then the algorithm proceeds through decision 178 of FIG. 2D, along path 190 to disable the coil outputs 298 and if there is still no enable present 290, 292, the state remains in the Stop mode and returns to the main algorithm at 266. If an enable signal has been received 290, 294, the state pointer is indexed to the Idle mode 296 and the state machine subroutine returns to the main algorithm at 266 to wait for a valid forward or reverse input request at 214, FIG. 2C.

If the test switch 48, FIG. 1, has been activated, the state is set to 5 for the Test mode and the state machine follows path 176, 177, 178, 179, 180, 192 of FIG. 2D and disables coil output at 298. It is noted that the system can easily be expanded to include additional states if desired by changing process 180 to a decision and adding additional states thereafter. Once in the Test mode state, if it is the first time this routine has been called on this power-up 300, 302, then the status indicator is flashed at the 70%–80% output 304 as is shown in the timing diagram of FIG. 3, and the system is returned to the main algorithm at 266. If it is not the first entry into the Test mode 300, 306, the system makes sure that at least two cycles of the 70%–80% status indication is displayed at 308 before proceeding along 310 to see if the test sequencer is pointed to the 80%–90% indication 312, and if so, that indication is displayed on the status indicator 314. Similarly, if the test sequencer is pointing to the 90%–95% indication 316, the status indicator displays the 95%–100% output 318, and if the test sequencer is pointing to the 100% indication 320, then the status indicator outputs the 100% indication 322. If the test sequencer is not pointing to any of the above, a check is made to see if a reset has actually been detected 324, and if not, the status indicator is energized at an 88% duty cycle 326, in order to indicate an error condition and returned to the main algorithm at 266. An 88% duty cycle is the inverse of the 80%>TPC≧70% shown in FIG. 3. If a reset has been detected at 324, the state pointer is indexed to the last state 328 and then returned to the main algorithm 266.

Referring to FIG. 2E, the subroutine that displays the thermal pile result on the status indicator 96 of FIG. 2A is shown in further detail. First, the thermal pile result (TPR)

is compared to the predetermined thermal pile capacity (TPC) threshold of the motor 340, and if the TPR is approximately equal to 100% of the TPC, the status indicator is turned ON, and kept on to appear to be a steady state output 342. If the TPC is between 95%–100%, the status indicator is flashed approximately four times per second 344, and if the TPC is between 90%–95%, the status indicator is flashed three times per second at 346. If the TPC is between 80%–90%, the LED in the status indicator is flashed two times per second at 348, and if the TPC is between 70%–80%, the LED is flashed one time per second 350. If the TPC falls between 70%, or did not reach above 70% or above, the LED is turned off or kept off 352, and the status indicator algorithm returns 354 to whatever other subroutine or main algorithm had called it.

Referring to FIG. 3, a timing diagram shows the various outputs of the status indicator as described in FIG. 2E in flowchart form. FIG. 3 shows that the LED output of the status indicator is kept high, or ON 360, for a TPC greater than or equal to 100%. For a TPC between 95%–100%, the LED is flashed approximately four times per second 362 and for a TPC between 85%–90%, the LED is flashed three times per second 364 with a short period of OFF time 366 per second. When the TPC is between 80%–90%, the LED is initially flashed twice 368 in the first half second, and then kept OFF 370 for the remaining period. When the TPC is between 70%–80%, the LED is initially switched ON once 372 and then kept OFF 374 for the remaining one-second period. It should be understood that this scheme for displaying a code for the temperature of the motor can be displayed in many various code forms, and that described is simply a preferred embodiment. Further, additional codes could be added in which the period of the ON time is widened or narrowed, or the overall test period of one-second could be widened or narrowed.

Figure 4B:
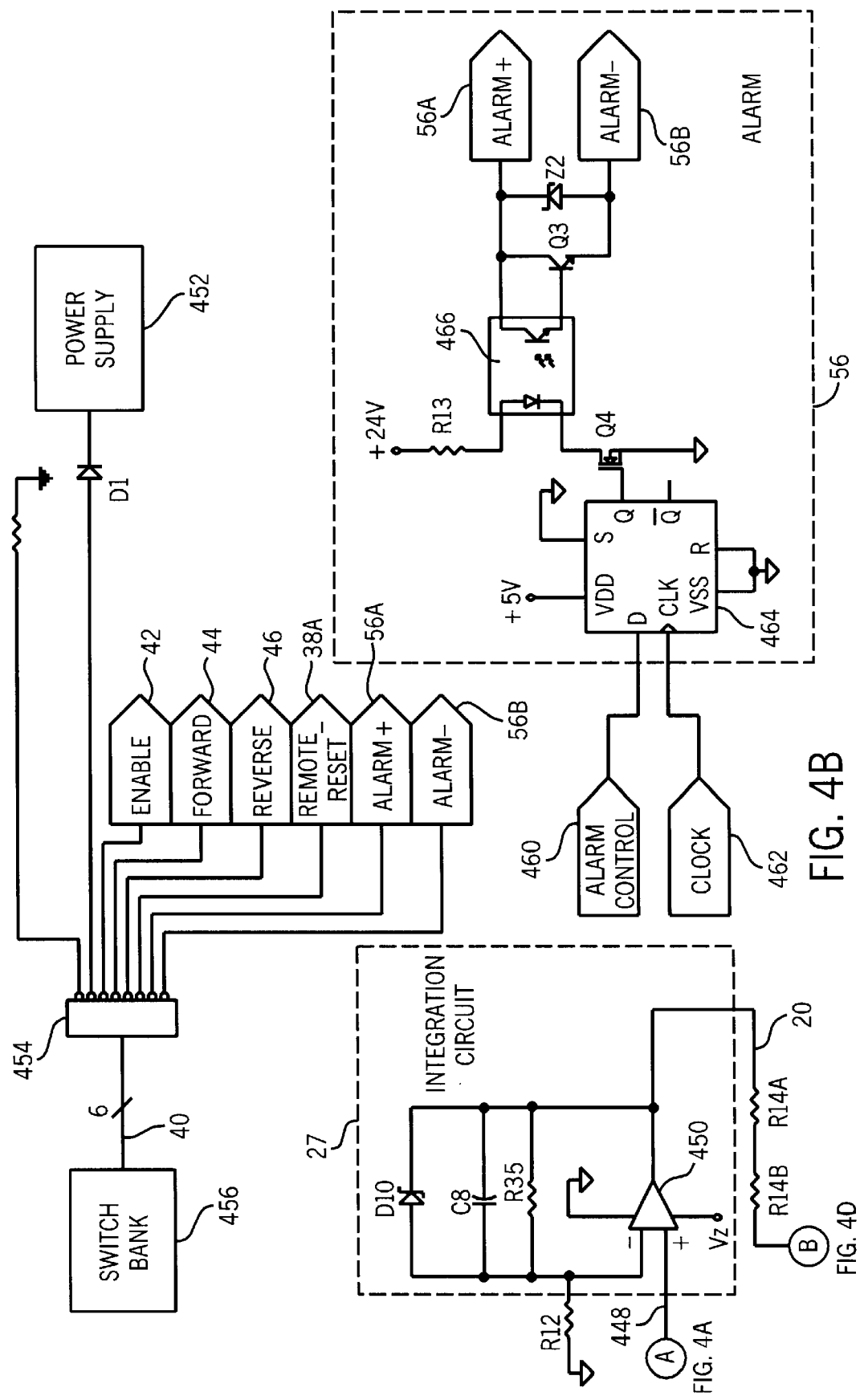

Referring now to FIGS. 4A–D, a detailed circuit schematic for the motor overload coil control 10 of FIG. 1 is shown. FIG. 4A shows a detailed schematic of the current sensors 22 and the three-phase current measurement 24, which includes a Hall effect current sensor bias circuit 400 having an op-amp 402 connected to resistors R10 and R15 to provide a bias voltage to Hall effect current sensors 404, 406 and 408 through switching transistors Q1, Q2, and Q5 which provides approximately a 1.4V DC bias to the AC coupled Hall effect sensors. The bias voltage enables the Hall effect sensor to produce a higher resolution output. A pair of capacitors 410, 412, and 414 are in the output of each Hall effect sensor and provides DC filtering from the Hall sensors. The capacitors 410–414 are sized to remove any DC signal on the outputs of the Hall devices, but are large enough to enable the circuit to work sufficiently on both 50 Hz and 60 Hz systems.

The resulting output is an AC differential output signal that is fed into an inverting differential amplifier circuit 416, 418, and 420 connected to receive the outputs from the Hall effect devices 404, 406 and 408, respectively. Each differential amplifier 416–420 includes a potentiometer 422, 424, and 426 to offset deviations in the Hall effect devices and any circuit deviations. The output of each differential amplifier 416–420 is fed to an RC network 428, 430, 432 to further filter the output signals which are then fed through a node 436, 438 and 440 that includes a Schottky diode D2, D3, D4 connected to ground which is intended to limit negative voltages from reaching op-amps 442, 444 and 446. In a preferred embodiment, the negative voltage is clipped at −0.3V to protect op-amps 442–446. Each output of op-amps 442, 444, and 446 has a diode D9, D11 and D12, respectively, in a feedback path with its inverting input which either blocks or passes the signal depending on which output is largest. This arrangement provides an output on line 448 that is a half-wave rectified signal. At any given time, the output on line 448 is the largest output from each of the phases.

Output signal 448 is then input to the integration circuit 27, FIG. 4B, having an op-amp 450 connected in a non-inverting configuration as an integrator with a Zener diode D10 in parallel with the integrating feedback path. The Zener diode D10 is provided to roll-off signals that are too large for proper A/D converting. This arrangement provides a 1:1 rise in the output, until the Zener voltage is reached, which afterwards provides a non-linear roll-off. This creates a combined linear and non-linear response so that the number of bits available between the UL test points of 105% and 120% of rated motor current is maximized. Without the Zener diode D10, the response would be strictly linear and the number of bits available would not provide enough quantization between the UL test points.

Figure 4C:
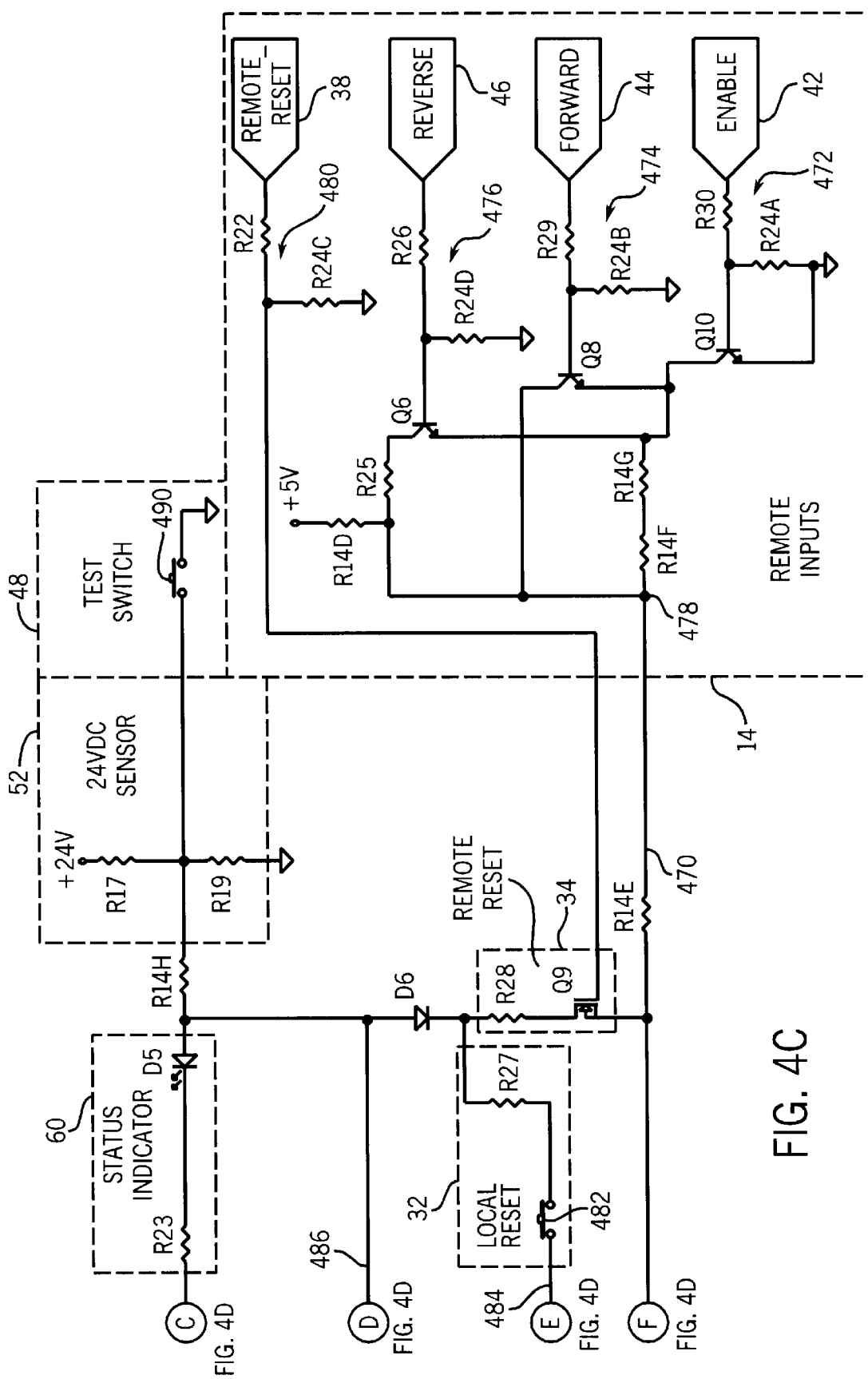
Figure 4D:
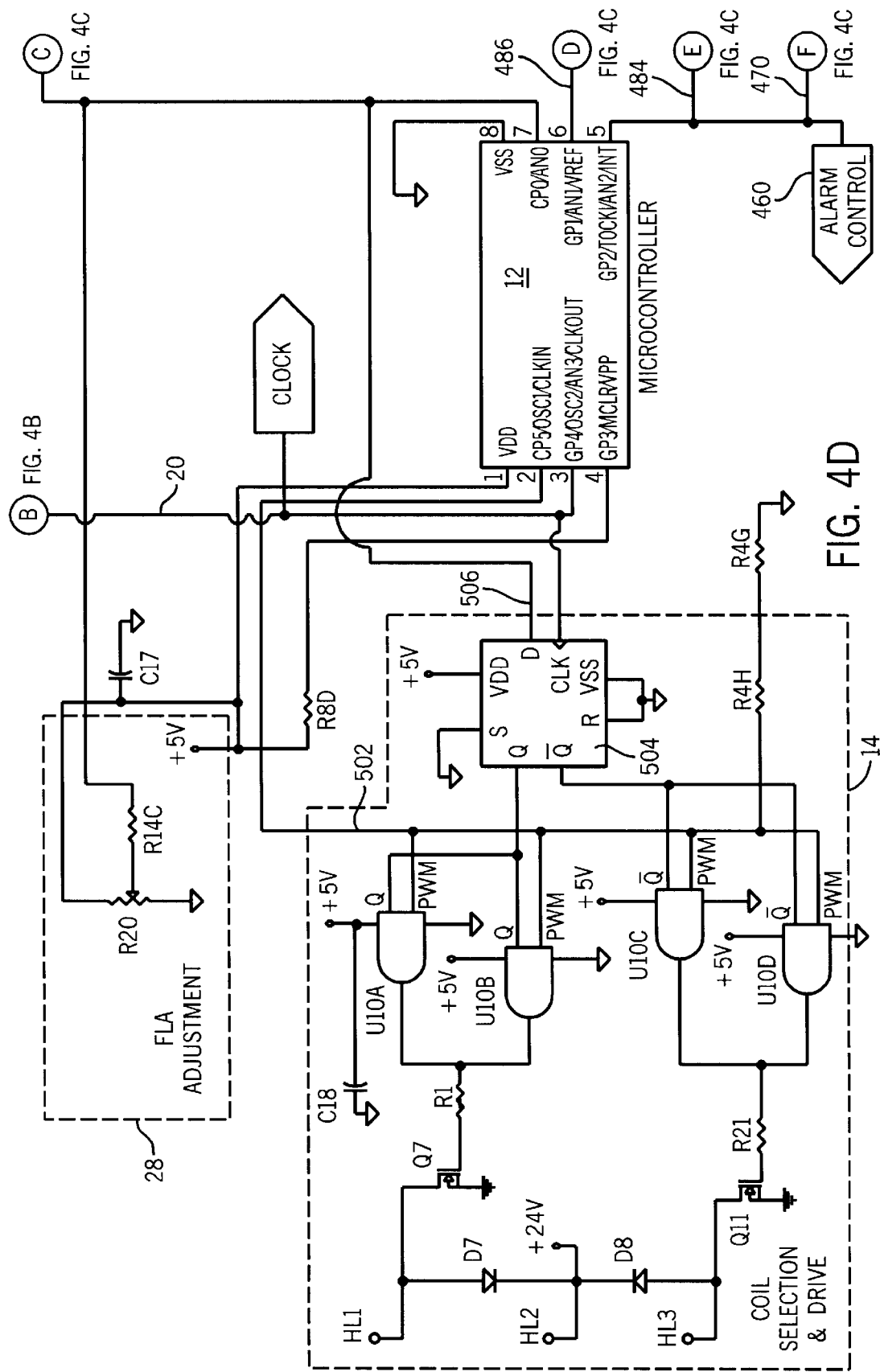

The output from the integration circuit 27 is the current sense input 20 fed to pin 3 of the microcontroller 12, FIG. 4D. Referring back to FIG. 4B, resistors R14A and R14B are current limiting resistors to protect the op-amp and microcontroller. A 24 VDC power supply 452 provides DC voltage to the coils and provides power for various lower supply voltages in the circuit. The power supply 452 is connected to an on-board pin connector 454 through diode D1. Since in many industrial applications, the motor relay and coil control are located relatively close to the motor, a remote panel with a control switch bank 456 can be provided for providing remote inputs 40 that are connected to the on-board pin connector 454 to provide an enable input 42, a forward input 44, a reverse input 46, a remote reset input 38A, and alarm output signals 56A and 56B. It is noted that the input control signals from the switch bank 456 can be from discrete switches, solid state switches, a PLC, or any other device that may produce the desired control input signals. The enable input 42 may also be referred to as a stop input if inverted, and is intended to enable or disable the coil control and, thus the motor, regardless of the other inputs. The forward and reverse inputs 44, 46, are for use with multiple coils and contactors, where one controls a forward motion of the motor, and the other controls the reverse motion of the motor. The control of the present invention can be used with multiple coils or a single coil. In applications with a single coil, the reverse input is not connected. For this reason, the reverse input has the lowest priority of the three. That is, the enable signal has the highest priority, then the forward, and then lastly the reverse. However, in certain applications having only a single contactor, the enable and forward may be tied together with the reverse not connected (ie. left open), such as in a pump/float application where the motor has specific start and stop control points.

The alarm 56 receives as inputs from the overload control circuit an alarm control 460 received from pin 5 of the microcontroller 12 and a clock signal 462 which are input to a flip-flop 464 which is connected to transistor Q4 to drive an opto-isolator 466. The opto-isolator 466 includes an internal infrared emitting diode that when active, directs light to an internal light sensitive transistor to close an output path. The opto-isolator is used to isolate the alarm from the control circuit. A relay could alternatively be used in place of the opto-isolator. The output of the opto-isolator 466 is connected to a transistor Q3 to form a Darlington pair to increase current flow capability for the remote alarm load (not shown). A Zener diode Z2 is provided to clamp the voltage to protect the opto-isolator from the inductive loads caused by many alarms. Transistor Q4 also allows the use of 24V on the opto-isolator to handle higher current capabilities on the output of the opto-isolator. When the alarm control 460 is high and the flip-flop 464 receives a clock pulse 462, the Q output goes high, causing the internal infrared diode in the opto-isolator 466 to transmit, in turn, activating the internal light-sensitive transistor of the opto-isolator closing the output path and turning on Q3 to close the current path between the ALARM+ 56A and the ALARM− 56B circuit which will activate a remote alarm.

Referring now to FIG. 4C, the aforementioned remote inputs are connected into a portion of the motor overload I/O reduction circuit 14. The enable input 42, together with the forward input 44 and the reverse input 46 are reduced to a single remote input 470 connected to pin 5 of the microcontroller 12, FIG. 4D. The condensed remote input 470 is connected to the microcontroller through resistor R14E which provides current limiting to the microcontroller and reduction circuitry. The enable input 42, the forward input 44, and the reverse input 46, are each connected to the base of a transistor Q10, Q8 and Q6, respectively, through a voltage divider 472, 474, and 476. The voltage dividers protect the base input of the transistors and requires the input to be greater than 5V. for the transistor to conduct, thereby increasing noise immunity. The transistors Q6, Q8 and Q10, along with resistors R14D, R14F, R14G and R25 are arranged to create an input signal divider network that differentiates and prioritizes the three input signals and condenses the three input signals on the single condensed remote input line 470, such as a signal multiplexer. That is, if neither the enable 42, the forward 44, or the reverse 46 are turned ON, or high, then none of the transistors Q10, Q8, nor Q6 are ON and the voltage at node 478, and on the input line 470 to the microcontroller, are at 5V, indicating to the microcontroller that the system is in a Stop mode. If the enable 42 is high, and the forward 44 and reverse 46 are OFF, or low, then only transistor Q10 is ON, causing a voltage across resistors R14F and R14G of approximately 3.5V. With the voltage at node 478 at 3.5V, the microcontroller recognizes that the system is in an Idle mode, or if already latched, already in the reverse or forward modes. If the enable 42 is high and the forward 44 is high, both transistors Q10 and Q8 are conducting causing the voltage at node 478 to drop to ground level, or 0V, indicating to the microcontroller that the forward coil should now be energized. If both the enable 42 and the reverse 46 are high, and the forward is low, transistors Q10 and Q6 will conduct, while transistor Q8 will be OFF. With only transistors Q10 and Q6 ON, the voltage drop across resistor R25 will cause a voltage of approximately 2.0V at node 478, indicating to the microcontroller that the system is enabled and the reverse coil should be energized. If all three inputs are turned ON, that is, the enable 42 signal is present, the forward 44 signal is present, and the reverse 46 signal is present, the enable 42 and forward 44 will take precedence causing the voltage at node 478 to ground potential and initiate the microcontroller to activate the forward coil and the reverse input becomes a "don't care."

The remote reset input 38A is fed through a voltage divider 480 to protect the gate of transistor Q9 which operates as a solid state remote reset 34. The solid state remote reset 34 and the local reset 32, which consists of a pushbutton switch 482, are connected in parallel and are connected to separate, but equivalent resistors R27 and R28. The local and remote resets 32, 34 are connected between pins 5 and 6 of the microcontroller on lines 484 and 486, respectively, the operation of which will be described hereinafter. Resistors R27 and R28 are chosen to have equivalent resistance so that the microcontroller can enter the reset regardless of which one is depressed, however, if both are reset simultaneously, the voltage drop across the combined resistors R27 and R28 will provide an increased voltage drop indicating to the control that the operating process is more important than the motor, and will keep the motor running even when the thermal threshold is exceeded by the motor, but will energize the alarm and the status indicator. Diode D6 is provided to isolate the local resets from the other functions of pin 6 on line 486.

Pin 6 of the microcontroller 12, FIG. 4D, is also tied to the status indicator 60 FIG. 4C, on input line 46 and to the 24 VDC sensor 52 and the test switch 48. The test switch 48 consists of a pushbutton switch 490, and when activated, pulls line 46 to ground potential to initiate the test mode. While pushbutton 490 is open, the 24 VDC sensor 52 provides a 0–5V analog signal on line 486 to track available voltage for activating the coils. The 24 VDC sensor 52 includes a voltage divider R17 and R19 sized to provide a 0–5V swing to the microcontroller. Resistor R14H is provided for current limiting to the microcontroller. Status indicator 60 includes LED D5 and resistor R23. The status indicator 60 is powered when pin 6, line 486, is acting as an output from microcontroller 12 for indicating the status of the control and the temperature of the motor.

Referring now to FIG. 4D, the microcontroller, or microprocessor, 12 is preferably an 8-bit, 8-pin Microchip PIC 12CE674. The microcontroller 12 sequences analog signal sampling and energizes or de-energizes inputs and outputs. In order to maximize the function and minimize the peripheral hardware, the majority of the microcontroller's pins are used as both inputs and outputs. Since pins 1, 8, and 4 are exclusively committed to power, ground, and power-on-reset, respectively, only 5 pins remain for the 13 possible input and outputs. Additionally, pin 2 has been dedicated exclusively for outputting a PWM signal on line 502 to the coil selection and drive.

Another portion of the motor overload I/O reduction circuit 14 is a part of the coil selection and drive circuit. The I/O reduction circuit 14 includes a flip-flop 504 connected to receive a clock signal from pin 3 of the microcontroller 12, and a coil selector signal on line 506 from pin 7 of the microcontroller 12. The flip-flop 504 outputs Q and Q' are each connected to a pair of AND gates U10A and U10B, U10C and U10D, respectively, to drive the gates of transistors Q7 and Q11 and drive the reverse coil between HL1 and HL2, or the forward coil between HL3 and HL2.

The FLA adjustment 128 includes a potentiometer R20, one side of which is tied to the 5V power source, and the other side, having a current limiting resistor R14C, tied to pin 7 as an input to microcontroller 12.

The microcontroller pin I/O selection will now be described. As previously mentioned, pin 1 is dedicated to the power supply for the microcontroller, and pin 8 is dedicated as a ground for the microcontroller 12. Pin 4 is connected to power through resistor R8D for a power-on-reset signal such that if power falls below a minimum, the microcontroller 12 is reset. Such resetting includes tri-stating all the outputs and pulling down the PWM to disable the coils. Because control of the coils, and thus the motor operation, is considered critical, pin 2 is solely dedicated to the PWM output. Therefore, pins 3, 5, 6 and 7 are the only available pins for the remaining 12 I/O's, which operation will now be described in detail.

Pin 3 operates as both an input and an output. As an input, pin 3 is programmed to receive the summed currents from the three-phase current sensors on the current sense input line 20. Pin 3 also has an output function in that it operates as a system clock output for the alarm control and coil selector circuits. In order for the microcontroller 12 to operate pin 3 as an input to sense the summed currents, first pin 6 must be sunk, and then the alarm control, pin 5, and the coil selector, pin 7, must be set to their proper states in case the input signal on line 3 looks like a clock pulse. In the event that it does, with the alarm control pin 5 and coil selector pin 7 set properly, flip-flops 504 and 464 will merely reiterate their correct outputs. The current sense signal is then read as an analog input on pin 3. The microcontroller uses a internal look-up table and assigns an appropriate current value. The $I^2t$ value is scaled based on an input from the FLA adjustment 28, and another look-up table is used to acquire the final value for $I^2t$ to be used in the thermal analysis of the motor. In order to use pin 3 as an output for the system clock, first microcontroller 12 sinks pin 6 to bring node 510 to ground potential and then sets the alarm control pin 5 and coil selector pin 7 to their proper, desired states, then outputs the clock signal on pin 3 to the flip-flops 504 for the coil selection and drive, and the flip-flop 464 of the alarm.

Pin 5 also functions as a multiple I/O. As an input, pin 5 receives a signal from input line 470 from the remote inputs indicating the proper desired state. The input on line 470, in a preferred embodiment, will indicate one of four possible voltages and states. That is, a 5V signal indicates a stop or disable command. A signal having a voltage of approximately 3.5V will indicate an enable, with no forward or reverse command, thereby placing the microcontroller in an idle mode or allowing continued run mode operation. An input voltage of approximately 2.0V indicates a command to enable the reverse coil, and an input voltage of approximately 0V will indicate a desire to enable the forward coil. In order to read pin 5 as an input, the microcontroller 12 first sinks pin 6 to avoid a false indication on the status indicator 60 and avoid a false reading from the resets 32 and 34.

Pin 5 is also used as an output for the alarm control 460. In order to do so, again pin 6 is pulled low before the alarm control signal is sent to control the flip-flop 464 of the alarm 56. The flip-flop 464 is used to latch the output from pin 5 so that the microprocessor can go on to further processing.

Pin 6 is used for two inputs and one output. One of the inputs read on pin 6 is the 24 VDC sensor 52. In order to do so, pin 7 is sourced to reverse bias LED D5 to keep the LED OFF, and pin 5 is set high to reverse bias diode D6, thereby avoiding interference from the resets. The 24 VDC sensor 52 can then be read in order to accurately adjust the PWM rate for voltage variances in the system. In a preferred embodiment, the system can accurately control the 24 VDC coils with the PWM signal sourced from a potential ranging from 18V to 30V.

Pin 6 also senses the input from test switch 48 in that if the pushbutton switch 490 is closed, node 510 will drop to approximately 0V, indicating to the microcontroller 12 that the test switch has been activated and the system will enter the test mode. Upon initially receiving an approximate 0V input on pin 6, the microcontroller 12 will immediately increase the PWM rate to its maximum, and debounce the test switch for approximately 1 second. If the switch is still depressed, the alarm will be set and the system will either enter the idle or reset modes, as previously described with reference to FIGS. 2A–2E.

Pin 6 also looks for a reset from either the local reset 32 or the remote reset 34. In order to do so, pin 5 is held low and pin 6 is sourced to form a complete circuit between pins 6 and 5. Pin 6 is then read as an analog input. If neither reset is active, pin 6 will be at approximately 5V, and no action is required. However, since R27 and R28 are of the same value, if either the local reset 32 or the remote reset 34 is initiated, pin 6 will experience a voltage drop of approximately 4.2V. The inputs are debounced by waiting approximately 1 second before any action is taken. The system does not care which one is active, if either is, it will enter the tripped mode. If both are active, pin 6 will experience an increased voltage drop and have thereon approximately 3.8V, in which case the system is in the trip mode, but set to the alarm but Do-not-trip mode, where the heating of the motor is sacrificed for maintaining process operation.

Pin 6 also acts as an output for the status indicator 60. To act as an output on line 486, pin 5 is kept high which reverse biases diode D6 and pin 7 is set low to sink the cathode of the LED D5 in the status indicator 60. The output of pin 6 can then control LED D5 based on the algorithm previously described. The status indicator 60 can output indications of an alarm condition, the thermal condition of the motor as set forth in the timing diagram of FIG. 3, rapidly flash the LED for a 1 second period on reset, and if the test button is locked down, can output the inverse of the 70%–80% TCP of the timing diagram of FIG. 3.

Pin 7 also functions as a multiple I/O. For pin 7 to act as an input, first pin 6 is held low and pin 5 is sourced to reverse bias diode D6 and keep the LED D5 OFF. Pin 7 can then read as an input, the output from the FLA adjustment 28 as an analog signal. To output on pin 7, and produce the coil selector signal on line 506 to the flip-flop 504 of the coil selection and drive, line 6 is kept low to keep the LED D5 OFF, and the flip-flop can then be controlled with both high and low signals. In order to operate the status indicator 60, pin 7 must be kept low, or in order to disable the LED D5 of the status indicator 60 during the sensing of the 24 VDC, or checking the test switch or resets, pin 7 must be kept high.

The interrupt routine earlier mentioned, is a 50 $\mu$s. "heartbeart," which generates a 20 kHz PWM for the coil(s), that actually alters the PWM output. The timer generates a 2 ms. flag for main line timing. This interrupt routine controls the duty cycle of the PWM-based ON voltage. The PWM value is based on the 24 VDC value and can vary from 10%–20% to maintain coil position while minimizing the power dissipated by the coil and contactor. In a preferred embodiment, the 50 $\mu$s. heartbeat allows for approximately 17 main line instructions to be executed every 50 $\mu$s., allowing 1 $\mu$s. for instruction. Since the math routines are relatively time intensive, the A/D sampling must alternate between the two sets of inputs as shown by the main line branch at 108, FIG. 2A.

The present invention has been described in terms of the preferred embodiment, and it is recognized that equivalents, alternatives, and modifications, aside from those expressly stated, are possible and within the scope of the appending claims.

What is claimed is:

1. A motor overload coil control comprising:
   a three-phase sensing circuit producing a current sense signal I;
   a full load amp (FLA) circuit having a user adjustable FLA setting and producing an FLA signal; and
   an 8-bit microcontroller receiving the current sense signal from the three-phase sensing circuit and the FLA signal from the FLA circuit and having therein a look-up table containing given model parameters, the microcontroller programmed to calculate a change in thermal pile dV(n) that models motor heating based on the current sense signal, the FLA signal, and the look-up table.

2. The motor overload coil control of claim 1 wherein the microcontroller is further programmed to calculate a real-time thermal pile V(n) by adding the last thermal pile result to the changed thermal pile dV(n).

3. The motor overload coil control of claim 1 wherein the microcontroller is programmed to calculate a change in thermal pile dV(n) that models motor heating based on the current sense signal, the FLA signal, and the look-up table according to a differential equation given by:

$$dV(n)=(I^2t(n)-V/R(n-1))1/C \cdot dt,$$

where: $I^2t(n)$ is selected from the look-up table using the current sense signal I, the FLA signal and a model analysis interval time t, C is a motor model capacitance, R is a motor model thermal resistance representing heat transport away from a motor, and V(n−1) is a last thermal pile result.

4. A method of calculating an operating electric motor temperature comprising the steps of:
   determining an FLA value for a motor;
   sensing current in a current path to the motor;
   defining an analysis interval time over which a temperature of the motor is to be determined;
   continue sensing current periodically for at least the analysis interval time; and
   defining a multi-step calculation subroutine to determine a thermal pile of the motor and performing a step of the multi-step calculation subroutine periodically, such period spaced over the analysis interval time.

5. The method of claim 4 wherein the step of determining an FLA value includes reading a user adjustable setting, and based on a selection by the user, correlating the setting selected to a look-up table in a memory unit.

6. The method of claim 4 further comprising the steps of:
   initializing a sequencer and then incrementing the sequencer with each periodic current sensing; and
   executing one step of the multi-step calculation subroutine based on a sequencer value.

7. The method of claim 4 wherein the multi-step calculation subroutine comprises the steps of:
   acquiring an $I^2t$ value, where I is the value for current to the motor and t is the analysis interval time;
   multiplying the $I^2t$ value by the FLA value;
   calculating heat dissipated from the motor;
   calculating $I^2t$ less the heat dissipated from the motor;
   calculating a change in thermal pile from a previous calculation; and
   calculating a new thermal pile.

8. The method of claim 7 further comprising the step of displaying a representation of the new thermal pile if the new thermal pile equals or exceeds a predetermined trip value.

9. The method of claim 4 wherein the step of sensing current is further defined as sensing current in each phase of a three-phase system with three Hall effect sensors, one Hall effect sensor in operable association with each phase of the three-phase system thereby providing three current signals.

10. The method of claim 9 further comprising the steps of summing the three current signals and creating a combined linear and nonlinear response, wherein the nonlinear response occurs at an upper end of a current capacity of the motor.

11. The method of claim 10 further comprising the step of A/D converting the summed current signals such that a quantization between data points is highest at predetermined test points arranged at the upper end of the current capacity of the motor.

12. A control to monitor temperature of a motor comprising:
   an FLA adjustment to calibrate the control to a desired motor and produce an FLA signal;
   at least one current sensor in operable association with a current path to the motor and producing a current sense signal;
   a processor connected to the FLA adjustment to receive the FLA signal and to the at least one current sensor to receive the current sense signal and programmed to:
      define an analysis interval time over which a temperature of the motor is to be determined;
      periodically receive the current sense signal from the at least one current sensor during the analysis interval time; and
      execute a multi-step calculation subroutine to determine a temperature of the motor over an analysis interval time.

13. The control of claim 12 wherein the processor is further programmed to increment an interval sequencer and execute no more than one step of the multi-step calculation subroutine per sequencer incrementation.

14. The control of claim 13 wherein the processor is further programmed to:
   acquire an $I^2t$ value, where I is the value for current to the motor and t is the analysis interval time;
   multiply the $I^2t$ value by the FLA value;
   calculate heat dissipated from the motor;
   calculate $I^2t$ less the heat dissipated from the motor;
   calculate a change in thermal pile from a previous calculation; and
   calculate a new thermal pile.

15. The control of claim 14 wherein the processor is further programmed to display a representation of the new thermal pile if the new thermal pile equals or exceeds a predetermined trip value.

16. The control of claim 12 wherein the processor is further programmed to determine an FLA value by reading a user adjustable setting, and based on a selection by the user, correlating the setting selected to a look-up table in a memory unit.

17. The control of claim 12 wherein the at least one current sensor includes three Hall effect sensors, each Hall effect sensor in operable association with one phase of a three-phase system, thereby providing three current signals.

18. The control of claim 17 further comprising a current sensor connected to the three Hall effect sensors to sum the three current signals and create a combined linear and nonlinear response, wherein the nonlinear response occurs at an upper end of a current capacity of the motor.

19. The control of claim 18 wherein the processor is further programmed to convert the summed current signals such that a quantization between data points is highest at predetermined test points arranged at the upper end of the current capacity of the motor.

20. A control process for a motor overload control comprising the steps of:
   upon system reset, including initial power-up, entering a power-up state that includes a status indication of the power-up state and disabling coil output;
   after a predetermined time period, entering an Idle mode and monitoring system inputs, including first checking an enable input, and unless an enable input command is present, entering a stop mode, otherwise checking to see if a valid motor control command is present, and if so, entering a PWM mode;

upon entering a PWM mode, initially activating a coil to activate motor motion with full coil power, then reducing power to the coil by generating a PWM signal for holding coil activation;

periodically checking the enable input command for continued presence of the enable input command and if not present, entering a stop mode; and upon entering the stop mode, disabling coil output.

21. The control process of claim 20 further comprising the step of providing an alarm but do-not-trip mode in which the motor motion is continued, while activating an alarm.

22. The control process of claim 20 further comprising the steps of monitoring motor temperature and activating an output signal when the motor temperature monitored exceeds a predetermined value.

23. The control process of claim 20 further comprising the steps of:

periodically checking for a system reset command, and if present, entering a trip mode; and upon entering the trip mode, disabling coil output.

* * * * *